United States Patent [19]

Voss et al.

[11] Patent Number: 4,822,275

[45] Date of Patent: Apr. 18, 1989

[54] APPARATUS FOR OPENING AND CLOSING MOLD HALVES

[75] Inventors: Hermann Voss, Seevetal; Manfred Mank, Hamburg, both of Fed. Rep. of Germany

[73] Assignee: Hermann Berstorff Maschinenbau GmbH, Hanover, Fed. Rep. of Germany

[21] Appl. No.: 239,532

[22] Filed: Sep. 1, 1988

[30] Foreign Application Priority Data

Sep. 3, 1987 [DE] Fed. Rep. of Germany ....... 3729451

[51] Int. Cl.[4] .................................. B29C 49/56
[52] U.S. Cl. ..................................... 425/539; 74/99 A; 74/107; 264/535; 264/538; 425/534; 425/540; 425/541
[58] Field of Search ................ 425/528, 534, 538–541, 425/451.4, 451.5, DIG. 5; 264/535, 538, 543; 74/99 A, 104, 107

[56] References Cited

U.S. PATENT DOCUMENTS

| | | | |
|---|---|---|---|
| 2,715,751 | 8/1955 | Weber | 264/538 X |
| 2,989,198 | 6/1961 | Bradley | 74/99 A X |
| 3,059,482 | 10/1962 | Petzoldt | 74/104 X |
| 3,596,315 | 8/1971 | Yoshikawa et al. | 425/539 X |
| 4,036,925 | 7/1977 | Kauffman et al. | 264/535 X |
| 4,140,468 | 2/1979 | Duga | 425/534 |
| 4,350,322 | 9/1982 | Mueller | 74/99 A X |
| 4,593,573 | 6/1986 | Bond | 74/107 X |

FOREIGN PATENT DOCUMENTS 3336071 10/1985 Fed. Rep. of Germany .

*Primary Examiner*—Richard L. Chiesa
*Attorney, Agent, or Firm*—Foley & Lardner, Schwartz, Jeffery, Schwaab, Mack, Blumenthal & Evans

[57] ABSTRACT

An arrangement for opening and closing mold halves of a blow mold is disclosed. The blow mold generally forms part of a stretching and blowing machine for blow-molding hollow bodies from thermoplastic plastics materials.

The mold halves are coupled to driven rocker arms, which are driven by driving rocker arms of a four-link gear, the pivot of the four-link gear being disposed immediately at the end of the common pivotal axis of the mold halves.

The driving rocker arm of the four-link gear is formed by cylinders, which are provided with cam tracks on their external curved surfaces in which rollers mounted on a sliding cam controller travel.

2 Claims, 5 Drawing Sheets

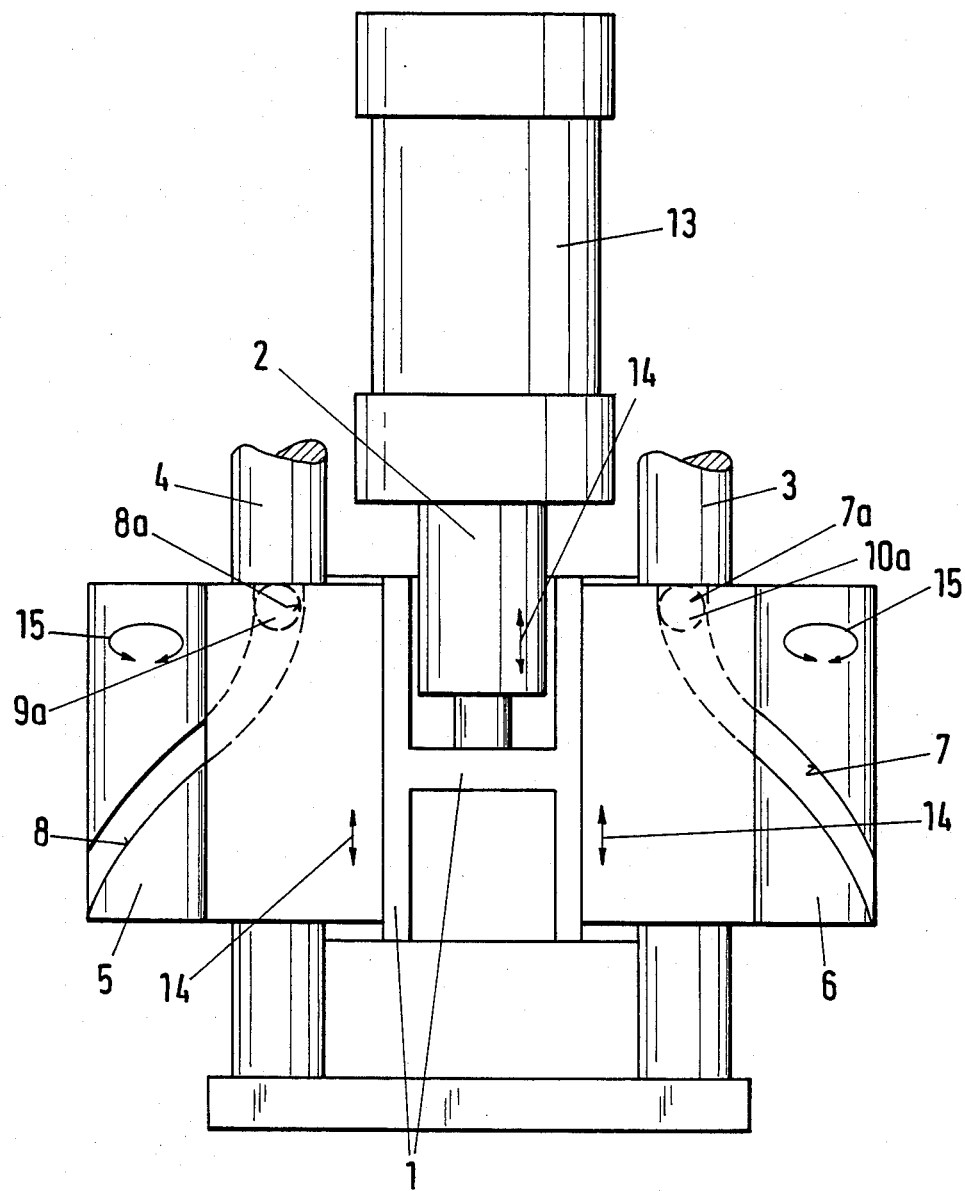

APPARATUS FOR OPENING AND CLOSING MOLD HALVES

FIELD OF THE INVENTION

The present invention relates to an apparatus for opening and closing mold halves. More particularly, the present invention relates to an apparatus for opening and closing mold halves which can be incorporated in a stretching and blowing station of an arrangement for blow-molding hollow bodies, such as bottles, from thermoplastic plastic materials.

BACKGROUND OF THE INVENTION AND PRIOR ART DISCUSSION

In German Patent Specification No. 3336071, there is described an apparatus for opening and closing mold halves. In such apparatus the mold halves have rollers which travel in cam tracks of a sliding cam controller.

The vertical movement of the controller is directly used for opening the mold halves, that is to say, to produce rotational movement of the mold halves. Since the mold halves are relatively heavy, it is necessary for a considerable mass to be accelerated and retarded in a relatively short period of time. The high level of direct power transmission involved in such an arrangment gives rise to high wear phenomena and requires much external energy to be supplied.

OBJECT OF THE INVENTION

The present invention seeks to provide an apparatus in which the operations for closing and opening the mold halves, particularly in stretching and blowing machines, can be effected in a rapid and extremely accurate manner, and in which the amount of force needed to accelerate and retard the heavy mold halves is minimised.

SUMMARY OF THE INVENTION

According to the present invention, there is provided an apparatus for opening and closing a blow mold, said blow mold comprising first and second mold halves and common pivot means for said mold halves, said apparatus comprising first rocker arm means operatively connected to each said mold half, said first rocker arm means comprising a guide arm member mounted on said mold half; second rocker arm means operatively connected to said first rocker arm means, said second rocker arm means comprising a coupling member, said coupling member having first and second opposed end regions, first pivot means mounted in said first end region for pivotally connecting said coupling members to said guide arm member, second pivot means mounted in said second end region of said coupling member and guide means pivotally connected to said second end region of said coupling member by said second pivot means; and drive means operatively connected to said second rocker arm means, said drive means comprising cylinder means fixedly mounting said guide means of said second rocker arm means, said cylinder means including an external curved surface, said curved surface defining cam track means, cam roller means engaging in said cam track means and sliding cam controller means mounting said cam roller means whereby actuation of said drive means causes pivotal movement of said first and second rocker arm means causing said mold halves to pivot about an axis, said axis coinciding with said common pivot means.

By combining such a cam gear assembly with such four-link gear assembly, less force is required to popen and close the mold rapidly. High acceleration and retardation forces are absorbed, and the mold halves are guided in an extremely accurate manner.

Because the frame pivot, which coincides with the pivot for the pivotal movement of the mold halves, is disposed immediately at the end of the parting line of the mold halves, a very short pivotal movement is achieved and, in consequence, the pivotal operation can be carried out considerably faster.

BRIEF DESCRIPTION OF THE DRAWINGS

A preferred embodiment of an apparatus for opening and closing mold halves in accordance with the present invention will be further described, by way of example, with reference to the accompanying drawings, in which:

FIG. 5 is a partial side elevational view taken along the line IV—IV of FIG. 2.

DESCRIPTION OF PREFERRED EMBODIMENT

Figure 1:
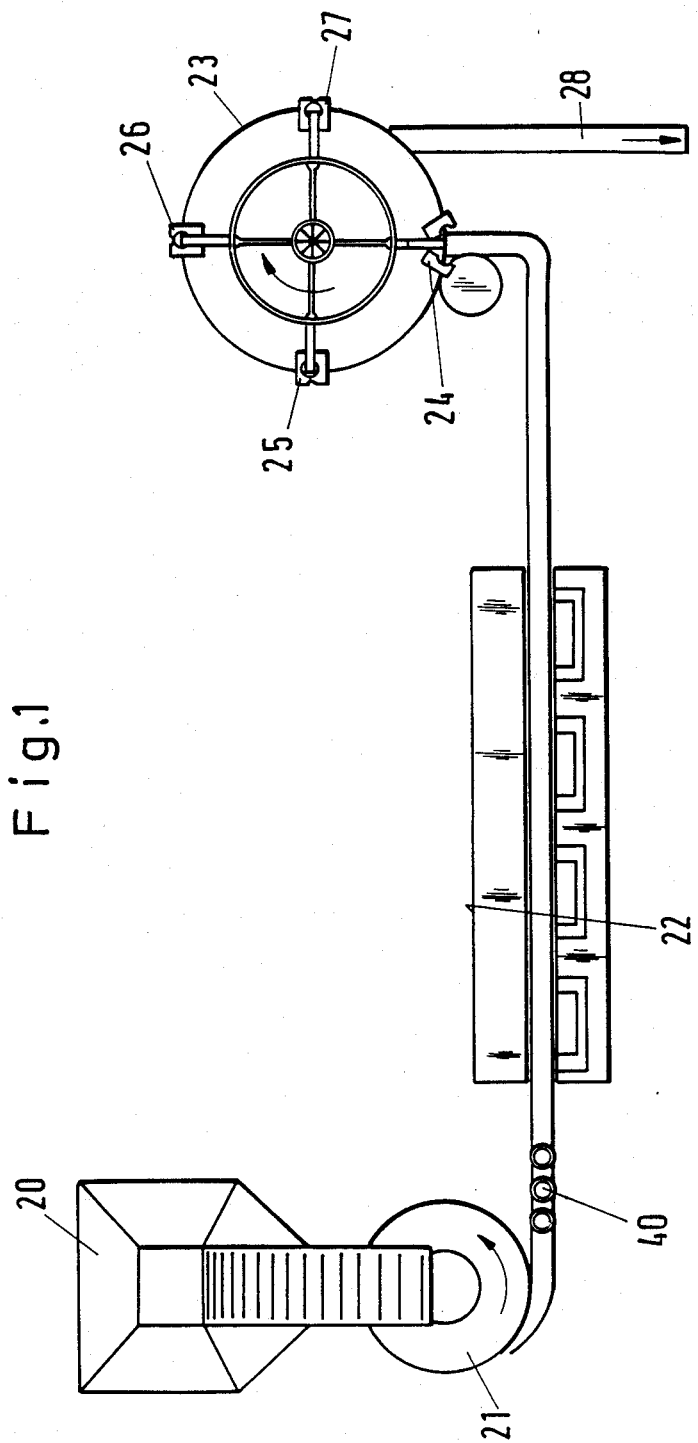
FIG. 1 is a schematic plan view of an arrangement for producing hollow bodies from preforms made of thermoplastic plastics materials.
Figure 2:
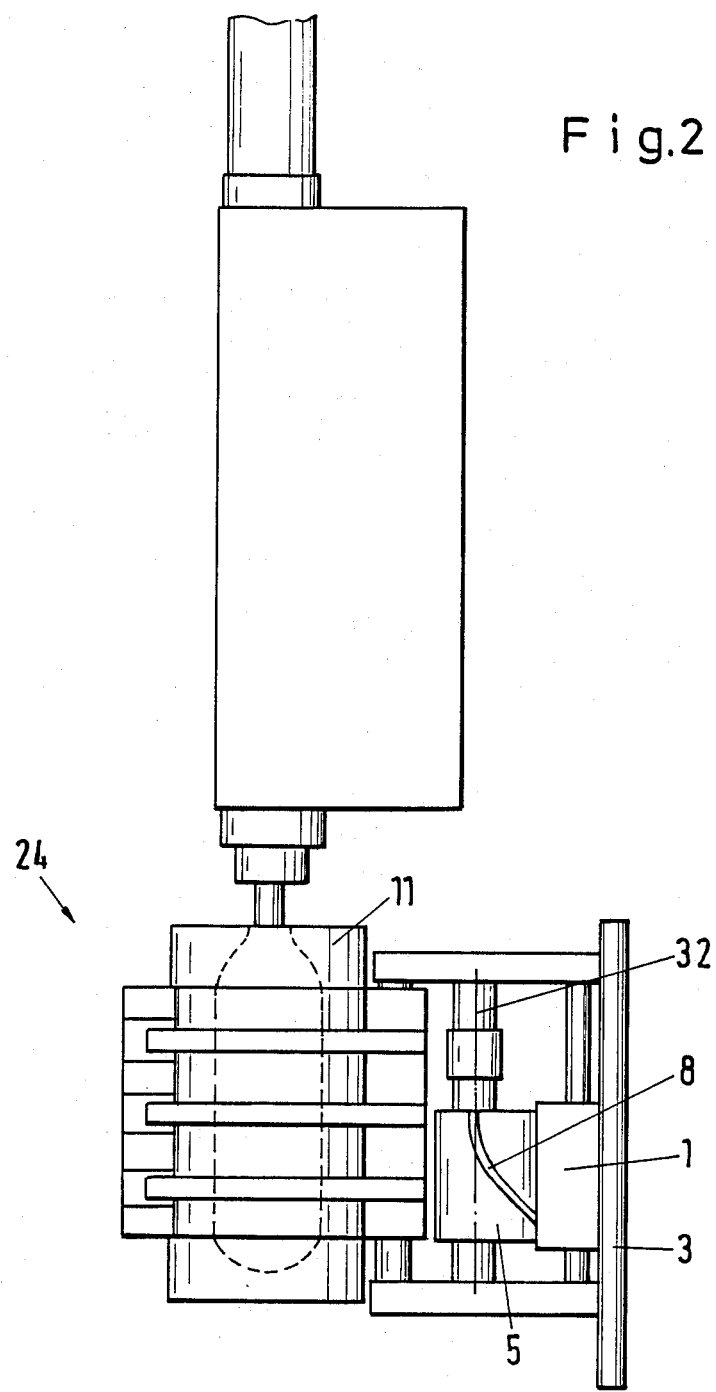
FIG. 2 is a schematical view of a pick-up station forming part of an apparatus for opening and closing mold halves.

In FIG. 1, there is shown, schematically, an arrangement for producing molded hollow articles, such as bottles, from thermoplastic plastic materials.

Preforms, previously produced by injection molding machine, are introduced into a steeply angled conveyor 20, from whence they are supplied to a sorting station 21. After sorting, the preforms 5 are fed to a heating station 22. After the heating process, the preforms are transferred to a blow wheel assembly 23, which comprises four molds for effecting extremely rapid longitudinal stretching and subsequent blowing of the heated preforms.

The blow wheel assembly 23 includes a pick-up station 24 which is opened up. A preform 5 is collected and the mold is closed. The blow wheel subsequently rotates through 90°, so that a new, opened mold becomes available. Stretching and blowing operations on the preform 5 occur in stations 25 and 26. The mold is opened at station 27, and the finished container is then supplied to a packaging machine (not shown) along a delivery path 28.

Figure 3:
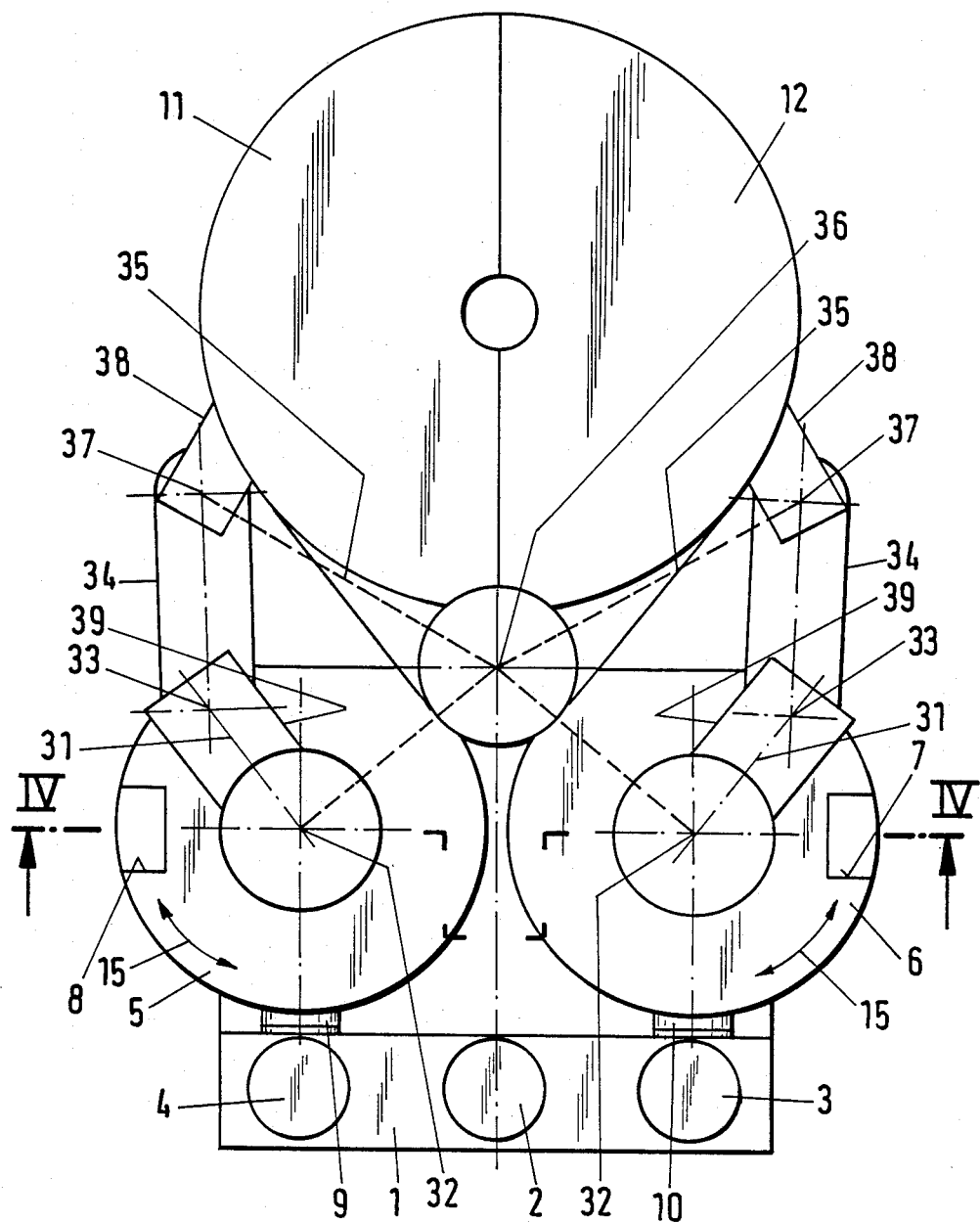
FIG. 3 is a cross-sectional view of a portion of a preform pick-up station shown in FIG. 2, the mold halves being shown in their closed state.
Figure 4:
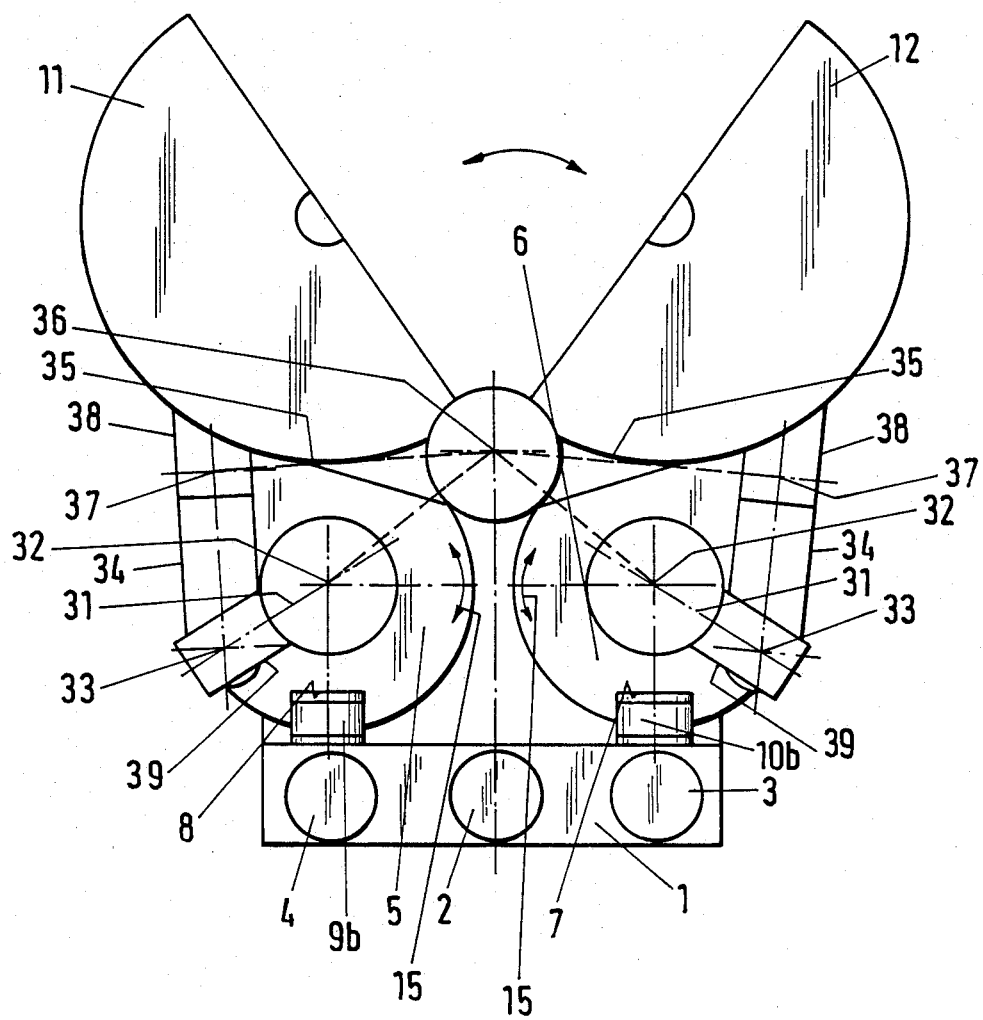
FIG. 4 is a cross-sectional view similar to that shown in FIG. 3 but showing the mold halves in their open state.

The pick-up station 24 is shown in greater detail in FIGS. 3 to 5, and comprises a slidable cam controller 1 which is vertically adjustable on guide rods 3 and 4. The adjustment is effected by means of a hydraulic piston and cylinder arrangement 13, the piston rod 2 of which is mounted on the cam controller 1. Rollers 9 and 10 are also mounted on the controller 1. These rollers are displaceable along cam tracks 7 and 8 formed in the external surface of cylinders 5 and 6. The displacement of the controller 1 controls the opening of mold halves 11 and 12 in a manner described in greater detail hereinafter.

It will be appreciated that identical arrangements need to be provided for each of the two mold halves. Identical reference numerals are therefore used for those component parts which are provided in connection with each mold half.

Guide means 39 are connected to each of the cylinders 5 and 6, one end thereof being mounted on the axis of rotation 32 of the cylinder and the other end being connected to a coupling member 34, the point of connection forming a pivot point 33. The other end of the coupling member 34 is connected to a pivot point 37, to a guide arm member 38 connected to the appropriate mold half 11 or 12.

When the mold halves are in their closed state, as is shown in FIG. 3, the cam rollers 9 and 10, which are mounted on the sliding controller 1, are in the positions shown by 9a and 10a respectively in FIG. 4. In their open state, the rollers are in the positions shown by 9b and 10b respectively. In order to open the mold halves, the piston rod 2 of the hydraulic cylinder 13 is moved into the hydraulic cylinder and the rod is moved out of the cylinder 13 to close them.

FIG. 5 shows the cam rollers 9 and 10 in upper positions 9a and 10a, that is to say, the mold is closed. Starting from this position, the piston rod 2 is displaced downwardly in the direction of arrow 14 and the cam rollers 9 and 10 slide along the cam tracks 7 and 8. Since the cylinders 5 and 6 are not free to move vertically, the sliding of the rollers 9 and 10 causes the cylinders to rotate about their own axes 32. In other words, the vertical movement of the piston rod 2 is converted into a rotational movement of the cam cylinders 5 and 6.

Such rotational movement, in one of the directions of the double-headed arrow 15, of the cylinders 5 and 6 about their axes 32 is transmitted to a four-link gear.

The cylinders 5 and 6, the rollers 9 and 10 and the cam tracks 7 and 8 form a cam gear assembly.

The four-link gear assembly comprises, effectively, a driving rocker arm 31 formed from the guide arm 39 having a fixed pivot point coinciding with the axis of rotation of the cylinder 5 and the coupling member 34 pivotally connected at pivot point 33 to the guide arm 39 and a driven rocker arm 35 formed from the guide arm 38 pivotally connected at 37 to the coupling member and the mold half 11 or 12 which is pivotable about a frame pivot point 36 and is secured thereto. In this case, the pivot point 36 is fixed and the pivot point 37 is floating.

In consequence, the opening and closing movements of the mold halves 11 and 12 are effected by means of such four-link gear assembly in combination with the cam gear assembly. Extremely short pivotal movements are achieved because the frame pivot 36 is disposed immediately at the end of the joint between the mold halves 11 and 12.

The arrangement makes it possible for vertical movement to be converted into rotational movement in an extremely accurate manner, such rotational movement being used to open and close the mold formed from the mold halves 11 and 12.

It is particularly advantageous to achieve these extremely accurate movements which are permitted by using the cam gear assembly in combination with the four-link gear assembly. This is because such movements can be effected in an extremely rapid and smooth manner without the need for any machine parts to come into contact with one another. This eliminates excessive noise problems; this aspect being of considerable importance if a normal commerical output of approximately 4,000 plastics bottles per hour is being considered.

The particular end positions of the moving machine parts are attained without, for example, the need for the mold halves 11 and 12 to collide with one another. This is because the rotational movement is retarded in a gentle, but extremely accurate manner by providing the cam tracks 7 and 8 with a configuration in which the end regions 7a and 8a thereof extend substantially vertically.

We claim:

1. An apparatus for opening and closing a blow mold, said blow mold comprising first and second mold halves and common pivot means for said mold halves, said apparatus comprising first rocker arm means operatively connected to each said mold half, said first rocker arm means comprising a guide arm member mounted on said mold half;

second rocker arm means operatively connected to said first rocker arm means, said second rocker arm means comprising a coupling member, said coupling member having first and second opposed end regions, first pivot means mounted in said first end region for pivotally connecting said coupling member to said guide arm member, second pivot means mounted in said second end region of said coupling member and guide means pivotally connected to said second end region of said coupling member by said second pivot means; and drive means operatively connected to said second rocker arm means, said drive means comprising cylinder means fixedly mounting said guide means of said second rocker arm means, said cylinder means including an external curved surface, said curved surface defining cam track means, cam roller means engaging in said cam track means and sliding cam controller means mounting said cam roller means whereby actuation of said drive means causes pivotal movement of said first and second rocker arm means causing said mold halves to pivot about an axis, said axis conciding with said common pivot means.

2. An apparatus as recited in claim 1 wherein said cam track means include first and second end portions, said end portions extending linearly, parallel to the axis of said cylinder.

* * * * *